US011443258B2

(12) United States Patent
Des Ligneris

(10) Patent No.: US 11,443,258 B2
(45) Date of Patent: Sep. 13, 2022

(54) REAL-TIME ORDER DELIVERY COORDINATION BETWEEN MULTIPLE MERCHANTS

(71) Applicant: Shopify Inc., Ottawa (CA)

(72) Inventor: Benoit Des Ligneris, Ottawa (CA)

(73) Assignee: Shopify Inc., Ottawa (CA)

(*) Notice: Subject to any disclaimer, the term of this patent is extended or adjusted under 35 U.S.C. 154(b) by 55 days.

(21) Appl. No.: 17/105,575

(22) Filed: Nov. 26, 2020

(65) Prior Publication Data

US 2022/0164757 A1  May 26, 2022

(51) Int. Cl.
*G06Q 10/06* (2012.01)
*G06Q 30/06* (2012.01)
*G06Q 10/08* (2012.01)
*G06Q 30/02* (2012.01)

(52) U.S. Cl.
CPC ........... *G06Q 10/063116* (2013.01); *G06Q 10/06312* (2013.01); *G06Q 10/087* (2013.01); *G06Q 10/08355* (2013.01); *G06Q 30/0205* (2013.01); *G06Q 30/0635* (2013.01)

(58) Field of Classification Search
CPC .. G06Q 10/083; G06Q 50/28; G06Q 30/0639; G06Q 10/087; G06Q 10/063116; G06Q 10/06311; G06Q 10/08355; G06Q 10/08; G06Q 10/047
See application file for complete search history.

(56) References Cited

U.S. PATENT DOCUMENTS

| | | | | |
|---|---|---|---|---|
| 7,177,825 | B1 * | 2/2007 | Borders | G06Q 30/016 705/28 |
| 7,251,621 | B1 * | 7/2007 | Weng | G06Q 40/04 705/26.81 |
| 7,587,345 | B2 * | 9/2009 | Mann | G06Q 10/08 705/28 |

(Continued)

OTHER PUBLICATIONS

Gendreau, Michael et al., Neighborhood search heuristics for a dynamic vehicle dispatching problem with pick-ups and deliveries, Transportation Research Part C, vol. 14, 2006 (Year: 2006).*

(Continued)

*Primary Examiner* — Scott L Jarrett
(74) *Attorney, Agent, or Firm* — Rowand LLP

(57) ABSTRACT

A computer-implemented is disclosed. The method includes: obtaining current delivery schedules of a plurality of delivery entities, the current delivery schedules including delivery data for pending deliveries of product orders associated with a plurality of merchants; receiving, from a computing device, a first order for a product associated with a first merchant; determining order data for the first order, the order data indicating, at least, an inventory location having available inventory of the product and a delivery destination for the first order; identifying a first set of the pending deliveries, the identifying including comparing delivery routes associated with said pending deliveries with order data for the first order; generating messages for causing delivery entities associated with the first set of pending deliveries to include the first order in their respective delivery schedules; and sending the generated messages to the respective delivery entities.

18 Claims, 6 Drawing Sheets

(56) References Cited

U.S. PATENT DOCUMENTS

| | | | | |
|---|---|---|---|---|
| 7,596,513 | B2* | 9/2009 | Fargo | G06Q 30/0625 705/26.62 |
| 7,693,653 | B2* | 4/2010 | Hussain | G01C 21/20 340/995.14 |
| 7,725,366 | B1* | 5/2010 | Franco | G06Q 10/08 705/28 |
| 8,001,017 | B1* | 8/2011 | Franco | G06Q 30/0601 705/28 |
| 8,131,607 | B2* | 3/2012 | Park | G06Q 10/047 705/28 |
| 8,756,119 | B1* | 6/2014 | Andrews | G06Q 30/0633 705/26.81 |
| 9,569,745 | B1* | 2/2017 | Ananthanarayanan | G01C 21/343 |
| 9,921,070 | B1* | 3/2018 | Nimchuk | G01C 21/3679 |
| 9,934,530 | B1* | 4/2018 | Iacono | G06Q 30/0639 |
| 10,043,149 | B1* | 8/2018 | Iacono | G07F 17/40 |
| 10,133,995 | B1* | 11/2018 | Reiss | G06Q 50/12 |
| 10,467,562 | B1* | 11/2019 | Mo | G06Q 10/063112 |
| 10,586,273 | B1* | 3/2020 | Kohli | G06Q 30/0637 |
| 10,740,715 | B1* | 8/2020 | Kumar | G06Q 30/0635 |
| 10,792,814 | B2* | 10/2020 | Hitchcock | H04L 67/125 |
| 10,930,157 | B2* | 2/2021 | Spector | G08G 1/0104 |
| 11,030,570 | B2* | 6/2021 | Raut | G08G 1/202 |
| 11,257,026 | B2* | 2/2022 | Martinez Hernandez Magro | G06Q 10/0834 |
| 2002/0152128 | A1* | 10/2002 | Walch | G06Q 30/0633 705/26.8 |
| 2003/0046173 | A1* | 3/2003 | Benjier | G06Q 30/0641 705/26.8 |
| 2004/0030572 | A1* | 2/2004 | Campbell | G01C 21/26 705/333 |
| 2005/0154626 | A1* | 7/2005 | Jones | G06Q 10/0631 705/7.12 |
| 2005/0246192 | A1* | 11/2005 | Jauffred | G06Q 10/08355 705/13 |
| 2006/0235739 | A1* | 10/2006 | Levis | G06Q 10/08 705/1.1 |
| 2007/0192111 | A1* | 8/2007 | Chasen | G06Q 10/08 705/338 |
| 2008/0275643 | A1* | 11/2008 | Yaqub | G01C 21/343 340/995.19 |
| 2009/0048890 | A1* | 2/2009 | Burgh | G06Q 10/06375 705/7.26 |
| 2009/0076933 | A1* | 3/2009 | Park | G06Q 10/047 705/28 |
| 2009/0216600 | A1* | 8/2009 | Hill | G06Q 30/02 705/7.14 |
| 2011/0300894 | A1* | 12/2011 | Roberts, Sr | G06Q 10/08 370/352 |
| 2014/0046585 | A1* | 2/2014 | Morris, IV | G08G 1/205 701/400 |
| 2014/0249947 | A1* | 9/2014 | Hicks | G06Q 10/087 705/21 |
| 2014/0279238 | A1* | 9/2014 | Jones | G06Q 30/0617 705/26.43 |
| 2014/0279294 | A1* | 9/2014 | Field-Darragh | G06Q 30/0282 705/28 |
| 2014/0280510 | A1* | 9/2014 | Putnam | H04L 67/10 709/203 |
| 2015/0100433 | A1* | 4/2015 | Choy | G06Q 30/0635 705/26.81 |
| 2015/0127572 | A1* | 5/2015 | Wada | G06Q 50/28 705/337 |
| 2015/0149381 | A1* | 5/2015 | Wada | G06Q 50/28 705/337 |
| 2015/0161564 | A1* | 6/2015 | Sweeney | G06Q 50/30 705/338 |
| 2015/0178823 | A1* | 6/2015 | Tanaka | G06Q 10/087 705/26.3 |
| 2015/0262121 | A1* | 9/2015 | Riel-Dalpe | G06Q 50/12 705/15 |
| 2016/0117638 | A1* | 4/2016 | DiSorbo | G06Q 10/083 705/333 |
| 2016/0171439 | A1* | 6/2016 | Ladden | G06T 7/0004 705/340 |
| 2016/0180288 | A1* | 6/2016 | Sager | G06Q 50/28 705/333 |
| 2016/0258774 | A1* | 9/2016 | Santilli | G01C 21/3697 |
| 2016/0379168 | A1* | 12/2016 | Foerster | G06Q 10/063116 705/7.16 |
| 2017/0046653 | A1* | 2/2017 | Wilson | G06Q 10/0838 |
| 2017/0178070 | A1* | 6/2017 | Wang | G06Q 10/0832 |
| 2017/0236088 | A1* | 8/2017 | Rao | G06Q 10/063112 705/7.17 |
| 2017/0255900 | A1* | 9/2017 | High | G06Q 10/087 |
| 2017/0372263 | A1* | 12/2017 | Kim | G06Q 10/08 |
| 2018/0089608 | A1* | 3/2018 | O'Hare | G06Q 10/047 |
| 2018/0268455 | A1* | 9/2018 | Shiely | G06F 16/9537 |
| 2018/0315319 | A1* | 11/2018 | Spector | G01C 21/343 |
| 2019/0101401 | A1* | 4/2019 | Balva | G06Q 50/30 |
| 2019/0130320 | A1* | 5/2019 | Friend, V | H04W 4/025 |
| 2019/0251621 | A1* | 8/2019 | Harmon | G06Q 20/12 |
| 2020/0043077 | A1* | 2/2020 | Turner | G06Q 30/0641 |
| 2020/0219055 | A1* | 7/2020 | Nagar | G06Q 10/0833 |
| 2020/0250617 | A1* | 8/2020 | Ryan | G01C 21/343 |
| 2020/0279217 | A1* | 9/2020 | Gravelle | G06Q 10/06316 |
| 2020/0334637 | A1* | 10/2020 | Turner | G06Q 10/08355 |
| 2021/0073726 | A1* | 3/2021 | Okodo | G06V 10/25 |
| 2021/0239473 | A1* | 8/2021 | Ma | G01C 21/3492 |
| 2021/0390614 | A1* | 12/2021 | Hill | G06Q 30/0635 |
| 2021/0398059 | A1* | 12/2021 | Gravelle | G06Q 30/04 |
| 2022/0036310 | A1* | 2/2022 | Heinla | G06Q 10/083 |
| 2022/0101414 | A1* | 3/2022 | Smith | G06Q 30/0633 |

OTHER PUBLICATIONS

User's Guide to Roadnet 5000—Routing and Scheduling System Version 5.6 Roadnet Technologies, 1996 (Year: 1996).*
Bent, Russell W. et al., Scenario-Based Planning for Partially Dynamic Vehicle Routing with Stochastic Customers Operations Research, vol. 52, No. 6, Nov.-Dec. 2004 (Year: 2004).*
Oracle Real-Time Scheduler for Retail Delivery and Logistics Oracle, 2009 (Year: 2009).*
Larsen, Allen, The Dynamic Vehicle Routing Problem Lingby, IMM, DTU, 2000 (Year: 2000).*
Chen Mark Chi-Hsun, Simulation and Optimization of Immediate Delivery Networks Massachusetts Institute of Technology, May 23, 2001 (Year: 2001).*
Scott: Swyft Raises $3 Million CAD To Expand Same-Day Delivery Software, Canadian Start Up News, retrieved from https://betakit.com/swyft-raises-3-million-cad-to-expand-same-day-delivery-software, dated Jul. 14, 2020.

* cited by examiner

REAL-TIME ORDER DELIVERY COORDINATION BETWEEN MULTIPLE MERCHANTS

FIELD

The present disclosure relates to computer-implemented e-commerce platforms and, in particular, to systems and methods for generating electronic messages to direct the shipping of products in association with e-commerce platforms.

BACKGROUND

Coordinating shipping services for delivering product orders in a timely manner is a complex exercise. Many merchants use third-party services (e.g. courier services, such as FedEx and United Parcel Service (UPS)) or provide their own delivery service. Third-party services can be costly, slow, and unreliable, while self-delivery services often result in capacity issues for merchants.

BRIEF DESCRIPTION OF THE DRAWINGS

Embodiments will be described, by way of example only, with reference to the accompanying figures wherein.

DETAILED DESCRIPTION

Figure 1:
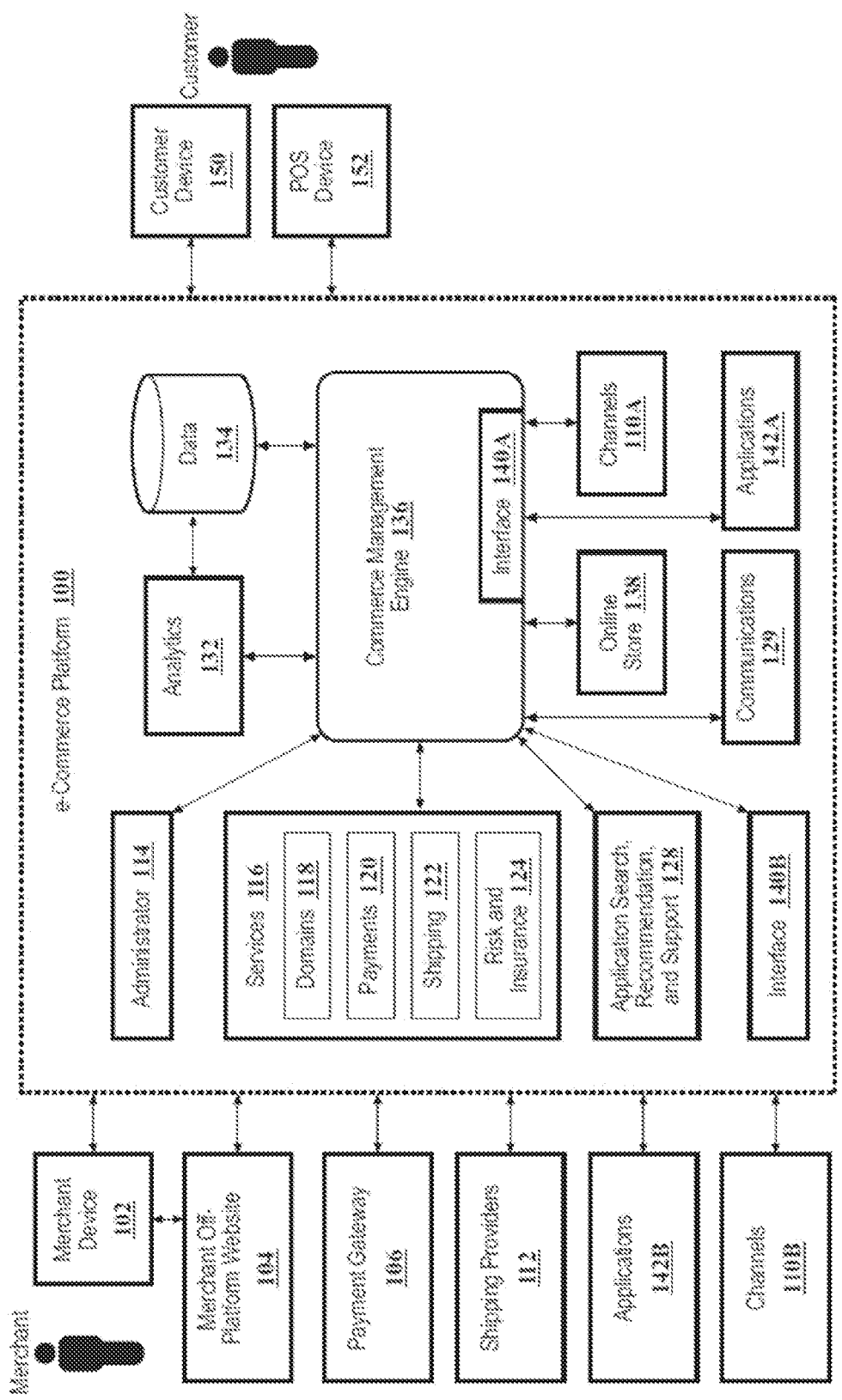
FIG. 1 is a block diagram of an e-commerce platform, according to an example embodiment.

In one aspect, the present application discloses a computer-implemented method. The method includes: obtaining current delivery schedules of a plurality of delivery entities, the current delivery schedules including delivery data for pending deliveries of product orders associated with a plurality of merchants; receiving, from a computing device, a first order for a product associated with a first merchant; determining order data for the first order, the order data indicating, at least, an inventory location having available inventory of the product and a delivery destination for the first order; identifying a first set of the pending deliveries, the identifying including comparing delivery routes associated with said pending deliveries with order data for the first order; generating messages for causing delivery entities associated with the first set of pending deliveries to include the first order in their respective delivery schedules; and sending the generated messages to the respective delivery entities.

In some implementations, at least one of the delivery entities may be a second merchant offering delivery services for product orders.

In some implementations, the delivery data may indicate, for each of the pending deliveries, at least one of a pick-up location, a drop-off location, a delivery route, or an expected delivery time.

In some implementations, the method may further include: determining delivery zones associated with the plurality of delivery entities; and identifying a subset of the delivery zones that includes one or more first delivery zones overlapping with at least a portion of a defined geographic area surrounding the delivery destination for the first order, wherein identifying the first set of the pending deliveries comprises determining the delivery entities associated with the one or more first delivery zones.

In some implementations, the method may further include: obtaining, for each of at least one of the delivery entities, a current delivery schedule, wherein the delivery zones associated with the plurality of delivery entities are determined based on the current delivery schedules for the plurality of delivery entities.

In some implementations, determining the delivery zones associated with the plurality of delivery entities may include determining, for each of at least one of the delivery entities, a defined geographic region that is covered by the delivery entity.

In some implementations, the generated messages may indicate at least one of a time or a route at which the first order may be slotted into the respective delivery schedules of the delivery entities.

In some implementations, the first set of pending deliveries may be identified based on evaluating at least one of: order criteria for the first order; or merchant criteria for the first merchant.

In some implementations, the method may further include: detecting a trigger condition associated with the first order; and in response to detecting the trigger condition, generating second messages for causing delivery entities associated with the first set of pending deliveries to update their respective delivery schedules with respect to the first order.

In some implementations, the method may further include monitoring real-time locations of one or more delivery vehicles associated with the delivery entities, wherein the first set of the pending deliveries is identified based on the real-time locations of the one or more delivery vehicles.

In another aspect, the present application discloses product delivery management system. The delivery management system includes a database storing data for a plurality of product items, a processor, and a memory storing computer-executable instructions. The instructions, when executed by the processor, are to cause the processor to: obtain current delivery schedules of a plurality of delivery entities, the current delivery schedules including delivery data for pending deliveries of product orders associated with a plurality of merchants; receive, from a computing device, a first order for a product associated with a first merchant; determine order data for the first order, the order data indicating, at least, an inventory location having available inventory of the product and a delivery destination for the first order; identify a first set of the pending deliveries, the identifying including comparing delivery routes associated with said pending deliveries with order data for the first order; generate messages for causing delivery entities associated with the first set of pending deliveries to include the first order in their respective delivery schedules; and send the generated messages to the respective delivery entities.

In another aspect, the present application discloses a non-transitory, computer-readable medium storing processor-executable instructions that, when executed by one or more processors, are to cause the one or more processors to carry out at least some of the operations of a method described herein.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . and . . . " is intended to cover any one or more of the listed elements, including any one of the listed elements alone, any sub-combination, or all of the elements, without necessarily excluding any additional elements, and without necessarily requiring all of the elements.

In the present application, the term "product data" refers generally to data associated with products that are offered for sale on an e-commerce platform. The product data for a product may include, without limitation, product specification, product category, manufacturer information, pricing details, stock availability, inventory location(s), expected delivery time, shipping rates, and tax and tariff information. While some product data may include static information (e.g. manufacturer name, product dimensions, etc.), other product data may be modified by a merchant on the e-commerce platform. For example, the offer price of a product may be varied by the merchant at any time. In particular, the merchant may set the product's offer price to a specific value and update said offer price as desired. Once an order is placed for the product at a certain price by a customer, the merchant commits to pricing; that is, the product price may not be changed for the placed order. Product data that a merchant may control (e.g. change, update, etc.) will be referred to as variable product data. More specifically, variable product data refers to product data that may be changed automatically or at the discretion of the merchant offering the product.

In the present application, the term "delivery entity" refers generally to entities that are capable of providing product delivery services. A delivery entity can deploy its delivery resources, such as aerial or ground delivery vehicles, to execute requested delivery jobs (e.g. delivery of a product order to purchaser). Examples of delivery entities include, but are not limited to, merchants that have self-delivery capacity, couriers, and third-party delivery services.

In the present application, the terms "order", "product order", "package", "parcel", and the like, will be used interchangeably to refer to a deliverable combination of one or more products that are ordered by a customer. An order may contain a single unit of a product, multiple units of the same product, or multiple different products (e.g. product bundles).

In the present application, the term "shipping", when used in the context of coordination and provision of services for transporting products, will be used to refer broadly to shipping and delivery processes for delivering products to desired destinations (e.g. customer addresses).

Example E-Commerce Platform

In some embodiments, the methods disclosed herein may be performed on or in association with an e-commerce platform. An example of an e-commerce platform will now be described.

FIG. 1 illustrates an e-commerce platform 100, according to one embodiment. The e-commerce platform 100 may be used to provide merchant products and services to customers. While the present disclosure contemplates using the apparatus, system, and process to purchase products and services, for simplicity the description herein will refer to products. All references to products throughout this disclosure should be understood to be references to products and/or services, including physical products, digital content, tickets, subscriptions, services to be provided, and the like.

While the disclosure throughout contemplates that a "merchant" and a "customer" may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to "merchants" and "customers", and describes their roles as such, the e-commerce platform 100 should be understood to more generally support users in an e-commerce environment, and all references to merchants and customers throughout this disclosure should also be understood to be references to users, such as where a user is a merchant-user (e.g. a seller, retailer, wholesaler, or provider of products), a customer-user (e.g. a buyer, purchase agent, or user of products), a prospective user (e.g. a user browsing and not yet committed to a purchase, a user evaluating the e-commerce platform 100 for potential use in marketing and selling products, and the like), a service provider user (e.g. a shipping provider 112, a financial provider, and the like), a company or corporate user (e.g. a company representative for purchase, sales, or use of products, an enterprise user, a customer relations or customer management agent, and the like), an information technology user, a computing entity user (e.g. a computing bot for purchase, sales, or use of products), and the like.

The e-commerce platform 100 may provide a centralized system for providing merchants with online resources and facilities for managing their business. The facilities described herein may be deployed, in part or in whole, through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g. a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g. "brick-and-mortar" retail stores), a merchant off-platform website 104 (e.g. a commerce Internet website or other internet or web property or asset supported by or on behalf of the merchant separately from the e-commerce platform), and the like. However, even such other merchant commerce facilities may be incorporated into the e-commerce platform, such as where POS devices 152 in a physical store of a merchant are linked to the e-commerce platform 100, where a merchant off-platform website 104 is tied to the e-commerce platform 100, such as through "buy buttons" that link content from the merchant off platform website 104 to the online store 138, and the like.

The online store 138 may represent a multitenant facility comprising a plurality of virtual storefronts. In some embodiments, merchants may manage one or more storefronts in the online store 138, such as through a merchant device 102 (e.g. computer, laptop computer, mobile computing device, and the like), and offer products to customers through a number of different channels 110A-B (e.g. an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop-ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure, the terms "online store" and "storefront" may be used synonymously to refer to a merchant's online e-commerce offering presence through the e-commerce platform 100, where an online store 138 may refer to the multitenant collection of storefronts supported by the e-commerce platform 100 (e.g. for a plurality of merchants) or to an individual merchant's storefront (e.g. a merchant's online store).

In some embodiments, a customer may interact through a customer device 150 (e.g. computer, laptop computer, mobile computing device, and the like), a POS device 152 (e.g. retail device, a kiosk, an automated checkout system, and the like), or any other commerce interface device known in the art. The e-commerce platform 100 may enable merchants to reach customers through the online store 138, through POS devices 152 in physical locations (e.g. a merchant's storefront or elsewhere), to promote commerce with customers through dialog via electronic communication facility 129, and the like, providing a system for reaching customers and facilitating merchant services for the real or virtual pathways available for reaching and interacting with customers.

In some embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g. accessed by users using a client, such as a thin client, via a web browser or other application, accessed through by POS devices, and the like). In some embodiments, elements of the e-commerce platform 100 may be implemented to operate on various platforms and operating systems, such as iOS™, Android™, on the web, and the like (e.g. the administrator 114 being implemented in multiple instances for a given online store for iOS™, Android™, and for the web, each with similar functionality).

In some embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150, and then the template language is replaced by data from the online store 138, such as when a theme is installed. The template and themes may consider tags, objects, and filters. The client device web browser (or other application) then renders the page accordingly.

In some embodiments, online stores 138 may be served by the e-commerce platform 100 to customers, where customers can browse and purchase the various products available (e.g. add products to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store 138 may implement a content management system for website content. Merchants may author blog posts or static pages and publish them to their online store 138, such as through blogs, articles, and the like, as well as configure navigation menus. Merchants may upload images (e.g. for products), videos, content, data, and the like to the e-commerce platform 100, such as for storage by the system (e.g. as data 134). In some embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may provide for integrated shipping services 122 (e.g. through an e-commerce platform shipping facility or through a third-party shipping carrier), such as providing merchants with real-time updates, tracking, automatic rate calculation, bulk order preparation, label printing, and the like.

Figure 2:
FIG. 2 is an example of a home page of an administrator, according to an example embodiment.

FIG. 2 depicts a non-limiting embodiment for a home page of an administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In some embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store, POS devices, and/or a buy button. The administrator 114 may also include interfaces for managing applications installed on the merchant's account, and settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g. days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a "view all recent activity" dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g. a card server), to reconcile financials, bill merchants, perform automated clearing house (ACH) transfers between an e-commerce platform 100 financial institution account and a merchant's bank account (e.g. when using capital), and the like. These systems may have Sarbanes-Oxley Act (SOX) compliance and a high level of diligence required in their development and operation. The financial facility 120 may also provide merchants with financial support, such as through the lending of capital (e.g. lending funds, cash advances, and the like) and provision of insurance. In addition, the e-commerce platform 100 may provide for a set of marketing and partner services and control the relationship between the e-commerce platform 100 and partners. They may also connect and onboard new merchants with the e-commerce platform 100. These services may enable merchant growth by making it easier for merchants to work across the e-commerce platform 100. Through these services, merchants may be provided help facilities via the e-commerce platform 100.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In some embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in some embodiments the e-commerce platform 100 may be configured with a commerce management engine 136 for content management, task automation, and data management to enable support and services to the plurality of online stores 138 (e.g. related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services. The applications 142A may be provided internal to the e-commerce platform 100 or applications 142B may be provided from outside the e-commerce platform 100. In some embodiments, an application 142A may be provided by the same party providing the platform 100 or by a different party. In some embodiments, an application 142B may be provided by the same party providing the platform 100 or by a different party. The commerce management engine 136 may be configured for flexibility and scalability through portioning (e.g. sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion in the commerce management engine 136 may need to exceed a core functionality threshold through which it may be determined that the function is core to a commerce experience (e.g. common to a majority of online store activities, such as across channels, administrator interfaces, merchant locations, industries, product types, and the like), is re-usable across online stores 138 (e.g. functions that can be re-used/modified across core functions), limited to the context of a single online store 138 at a time (e.g. implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, rather than violating the isolation principle, it may be preferred to move these components out of the commerce management engine 136 and into their own infrastructure within the e-commerce platform 100.

In some embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a rapid and accurate checkout. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. Thus, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g. that is surfaced through extensions/API), and the like. Merchants may be enabled to discover and install applications 142A-B through application search, recommendations, and support 128. In some embodiments, core products, core extension points, applications, and the administrator 114 may be developed to work together. For instance, application extension points may be built inside the administrator 114 so that core features may be extended by way of applications, which may deliver functionality to a merchant through the extension.

In some embodiments, applications 142A-B may deliver functionality to a merchant through the interface 140A-B, such as where an application 142A-B is able to surface transaction data to a merchant (e.g. app: "engine, surface my app data in mobile and web admin using the embedded app SDK"), and/or where the commerce management engine 136 is able to ask the application to perform work on demand (e.g. engine: "app, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as by utilizing APIs to expose the functionality and data available through and within the commerce management engine 136 to the functionality of applications (e.g. through REST, GraphQL, and the like). For instance, the e-commerce platform 100 may provide API interfaces 140A-B to merchant and partner-facing products and services, such as application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g. as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g. merchandising, inventory, discounts, fulfillment, and the like) and online store tasks (e.g. applications related to their online shop, for flash-sales, new product offerings, and the like), where applications 142A-B, through extension/API 140A-B, help make products easy to view and purchase in a fast growing marketplace. In some embodiments, partners, application developers, internal applications facilities, and the like, may be provided with a software development kit (SDK), such as through creating a frame within the administrator 114 that sandboxes an application interface. In some embodiments, the administrator 114 may not have control over or be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, for synchronizing a local database, notifying an external integration partner, and the like. Update events may enable this functionality without having to constantly poll the commerce management engine 136 to check for updates, such as through an update event subscription. In some embodiments, when a change related to an update event subscription occurs, the commerce management engine 136 may post a request, such as to a defined callback URL. The body of this request may contain a new state of the object and a description of the action or event. Update event subscriptions may be created manually, in the administrator facility 114, or automatically (e.g. via the API 140A-B). In some embodiments, update events may be queued and processed asynchronously from a state change that triggered them, which may produce an update event notification that is not distributed in real-time.

In some embodiments, the e-commerce platform 100 may provide application search, recommendation and support 128 functionalities. Application search, recommendation and support 128 may include developer products and tools to aid in the development of applications, an application dashboard (e.g. to provide developers with a development interface, to administrators for management of applications, to merchants for customization of applications, and the like), facilities for installing and providing permissions with respect to providing access to an application 142A-B (e.g. for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized for application development performed by any entity, including the merchant developing their own application 142A-B, a third-party developer developing an application 142A-B (e.g. contracted by a merchant, developed on their own to offer to the public, contracted for use in association with the e-commerce platform 100, and the like), or an application 142A or 142B being developed by internal personal resources associated with the e-commerce platform 100. In some embodiments, applications 142A-B may be assigned an application identifier (ID), such as for linking to an application (e.g. through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, and integration applications. Customer-facing applications 142A-B may include online store 138 or channels 110A-B that are places where merchants can list products and have them purchased (e.g. the online store, applications for flash sales (e.g. merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g. through applications related to the web or website or to mobile devices), run their business (e.g. through applications related to POS devices), to grow their business (e.g. through applications related to shipping (e.g. drop shipping), use of automated agents, use of process flow development and improvements), and the like. Integration applications may include applications that provide useful integrations that participate in the running of a business, such as shipping providers 112 and payment gateways.

In some embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In some embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g. a "default variant" is created for a product without any options). To facilitate browsing and management, products may be grouped into collections, provided product identifiers (e.g. stock keeping unit (SKU)), and the like. Collections of products may be built by either manually categorizing products into one (e.g. a custom collection), by building rulesets for automatic classification (e.g. a smart collection), and the like. Products may be viewed as 2D images, 3D images, rotating view images, through a virtual or augmented reality interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g. for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g. in an abandoned checkout feature). For those reasons, checkouts can have much longer lifespans than carts (hours or even days) and are therefore persisted. Checkouts may calculate taxes and shipping rates based on the customer's shipping address. Checkout may delegate the calculation of taxes to a tax component and the calculation of shipping rates to a delivery component. A pricing component may enable merchants to create discount codes (e.g. "secret" strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g. a set of prerequisites that when met imply a set of entitlements). For instance, prerequisites may be items such as "the order subtotal is greater than $100" or "the shipping rate is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency, or a store of value (such as dollars or a cryptocurrency) to and from customers and merchants. Communication with the various payment providers (e.g. online payment systems, mobile payment systems, digital wallet, credit card gateways, and the like) may be implemented within a payment processing component. The actual interactions with the payment gateways 106 may be provided through a card server environment. In some embodiments, the payment gateway 106 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 136 may support many other payment methods, such as through an offsite payment gateway 106 (e.g. where the customer is redirected to another website), manually (e.g. cash), online payment methods (e.g. online payment systems, mobile payment systems, digital wallet, credit card gateways, and the like), gift cards, and the like.

At the end of the checkout process, an order is created. An order is a contract of sale between the merchant and the customer where the merchant agrees to provide the goods and services listed on the orders (e.g. order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts, to avoid over-selling (e.g. merchants may control this behavior from the inventory policy of each variant). Inventory reservation may have a short time span (e.g. minutes) and may need to be very fast and scalable to support flash sales (e.g. a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order, or incoming from an inventory transfer component (e.g. from a vendor).

The merchant may then review and fulfill (or cancel) the order. A review component may implement a business process merchants use to ensure orders are suitable for fulfillment before actually fulfilling them. Orders may be fraudulent, require verification (e.g. ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g. credit card information) or wait to receive it (e.g. via a bank transfer, check, and the like) and mark the order as paid. The merchant may now prepare the products for delivery. In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g. at merchant managed locations) used when the merchant picks and packs the products in a box, purchase a shipping label and input its tracking number, or just mark the item as fulfilled. A custom fulfillment service may send an email (e.g. a location that doesn't provide an API connection). An API fulfillment service may trigger a third party, where the third-party application creates a fulfillment record. A legacy fulfillment service may trigger a custom API call from the commerce management engine 136 to a third party (e.g. fulfillment by Amazon). A gift card fulfillment service may provision (e.g. generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. Conditions may be imposed on returns, such as requiring that they be initiated within a set period (e.g. 30 days) of the original order date. The business process merchants may go through to "un-sell" an item may be implemented by a return component. Returns may consist of a variety of different actions, such as: a re-stock, where the product that was sold actually comes back into the business and is sellable again; a refund, where the money that was collected from the customer is partially or fully returned; an accounting adjustment noting how much money was refunded (e.g. including if there was any re-stocking fees, or goods that weren't returned and remain in the customer's hands); and the like. A return may represent a change to the contract of sale (e.g. the order), and where the e-commerce platform 100 may make the merchant aware of compliance issues with respect to legal obligations (e.g. with respect to taxes). In some embodiments, the e-commerce platform 100 may enable merchants to keep track of changes to the contract of sales over time, such as implemented through a sales model component (e.g. an append-only date-based ledger that records sale-related events that happened to an item).

Product Order Delivery Management System

Delivery of products to customers is often a complex process that involves extensive coordination between merchants and third-party delivery service providers (e.g. couriers, etc.). A merchant can independently administer their own local delivery service, by processing orders for their products and dispatching the orders to be delivered to customers. The orders may be delivered by the merchant themselves, for example, by deploying their own delivery vehicles, or by requesting execution of order deliveries by a third-party service.

For an individual merchant, there are technical limitations to administering an effective product delivery service. A merchant system (e.g. a computing system associated with a merchant) may only be able to query third-party delivery services individually. That is, a merchant system may itself be required to query a plurality of third-party delivery services in order to schedule delivery of its products. This represents a significant inefficiency, as each merchant system has to query third-party services for availability and/or capacity data independently. Moreover, routing decisions would generally be left to the third-party services, which may not always be optimal for individual merchants.

Generally, responses to queries for third-party delivery services may only indicate availability status and/or capacity information. For example, a delivery service may simply indicate that it is "unavailable" during a specific time slot if its delivery resources (e.g. vehicles) are occupied during the time slot. In particular, the query responses may not provide information that is conducive to optimizing delivery routing, and individual merchants cannot leverage existing delivery route information for third-party delivery services.

The proposed solutions disclosed in the present application address these technical limitations associated with managing delivery of products that are offered for sale on an e-commerce platform. A product delivery management system that allows for coordinating delivery routes across multiple merchants is described. The product delivery management system aggregates product orders for multiple merchants together for delivery. The orders are deployed to available delivery entities by causing the orders to be included in the respective delivery schedules associated with the delivery entities. Each order delivery job may be decomposed into multiple segments, where merchant locations (e.g. retail locations, warehouses, fulfilment centres, or any other inventory storage locations) may serve as intermediate hubs for package drop-offs/pick-ups, and different delivery entities may be engaged for different segments of a delivery job. In this way, the disclosed delivery management system facilitates coordination between merchant computing systems to leverage existing delivery route information and merchant hubs data as a basis for efficient scheduling of order deliveries to customers. The delivery management system enables merchants to supplement their own shipping and delivery capacities by leveraging a mesh network of third-party delivery entities, such as couriers, for delivering the merchants' product orders. As will be apparent from the following description, the present application discloses technical implementations of a delivery management system that represents an enhancement over independent, individualized delivery services for merchants.

Figure 3:
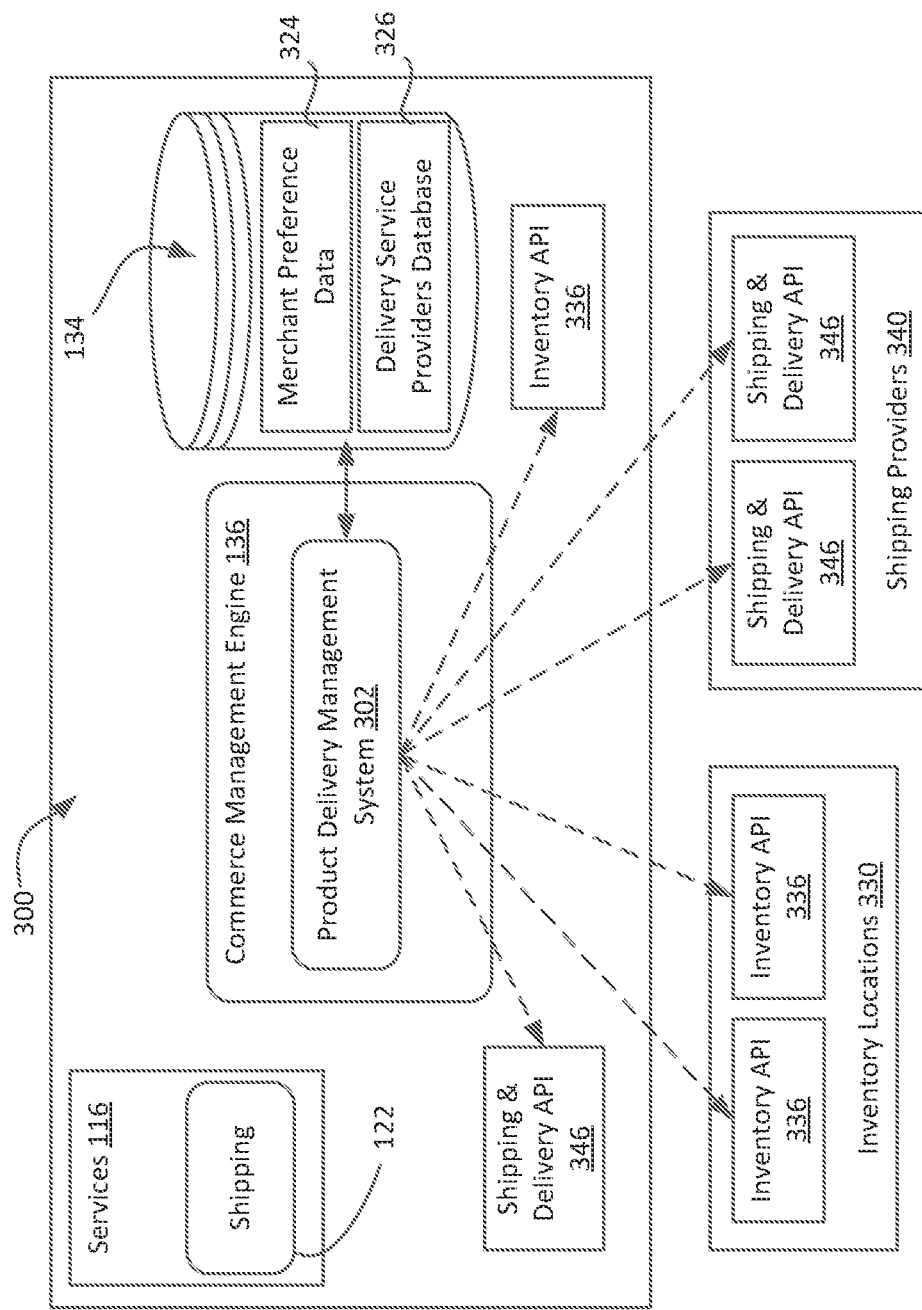
FIG. 3 partially illustrates an example e-commerce platform in block diagram form.

Reference is made to FIG. 3, which illustrates an example e-commerce platform 300 in block diagram form. Not all components of the e-commerce platform 300 are illustrated. The e-commerce platform 300 includes the commerce management engine 136, services 116, and the data facility 134. The commerce management engine 136 includes a product delivery management system 302. The product delivery management system 302 may be a software-implemented module containing processor-executable instructions that, when executed by one or more processors in the e-commerce platform 300, cause the e-commerce platform 300 to carry out some of the processes and functions described herein. Although illustrated as a standalone module within the commerce management engine 136, it will be appreciated that the product delivery management system 302, or parts of it, may be implemented within one or more of the applications 142A-B, and/or within other components of the commerce management engine 136. Additionally, or alternatively, the product delivery management system 302 may be provided as a service that is external to the e-commerce platform 300. In particular, the e-commerce platform 300 may engage the product delivery management system 302 as a service that is independent of the e-commerce platform 300 and which facilitates delivery of products that are sold on the e-commerce platform 300. More broadly, in some implementations, the subject matter of the present application may be employed in manners independent of a particular e-commerce platform. For example, it may be that the product delivery management 302 is implemented and deployed so as to be independent of any e-commerce platform The product delivery management system 302 is configured to manage delivery of products that are ordered on the platform 300. The product delivery management system 302 obtains customer input data from customer devices defining orders, merchant input data from merchant computing systems defining product data for products offered by the merchants, and delivery schedule and routing data from delivery entities, including third-party delivery services and/or merchants. Notably, although the product delivery management system 302 is shown as a component of the platform 300, this is by no means required. For example, the product delivery management system 302 may be external to the e-commerce platform 300 in some implementations. More broadly, the product delivery management system 302 may, as mentioned above, be implemented/deployed without reference to an e-commerce system without departing from the subject matter of the present application The product delivery management system 302 is communicably connected to a data facility 134. In the example of FIG. 3, the data facility 134 is shown as being integral to the e-commerce platform 300 but may be external to it in other implementations. The data facility 134 may include one or more data storage units. In some cases, the data storage may be in database format and may include one or more databases. The databases may be relational databases, in some examples. The data facility 134 is illustrated as a single unit for ease of illustration, but may include a plurality of storage units and, in some cases, storage media connected via network and external to the e-commerce platform 300. The product delivery management system 302 is configured to access one or more of the storage units of data facility 134. For example, the product delivery management system 302 may formulate database queries for retrieving merchant preference data 324 and/or data from a delivery service providers database 326.

The data facility 134 may store data collected by the e-commerce platform 300 based on the interaction of merchants and customers with the e-commerce platform 300. For example, merchants provide data through their online sales activity. Examples of merchant data for a merchant include, without limitation, merchant identifying information, product data for products offered for sale, online store settings, geographical regions of sales activity, historical sales data, and inventory locations. Customer data, or data which is based on the interaction of customers and prospective purchasers with the e-commerce platform 300, may also be collected and stored in the data facility 134. Such customer data is obtained on the basis of inputs received via customer devices associated with the customers/prospective purchasers. By way of example, historical transaction event data including details of purchase transaction events by customers on the e-commerce platform 300 may be recorded and such transaction event data may be considered customer data. Such transaction event data may indicate product identifiers, date/time of purchase, final sale price, purchaser information (including geographical region of customer), and payment method details, among others. Other data vis-à-vis the use of platform 300 by merchants and customers (or prospective purchasers) may be collected and stored in the data facility 134.

The merchant preference data 324 includes data indicating the preference of merchants with respect to their practice for determining delivery options for their products. For example, a merchant may have existing rules, preferences, and/or conditions in place for deciding on delivery options for products that are acceptable to present to prospective customers. The merchant preference data 324 may indicate merchants' rankings, preferences, and/or restrictions relating to delivery service options, and may define conditional criteria for automatically selecting suitable services for delivering product orders. By way of example, the merchant preference data 324 may specify, for a merchant, when to use self-delivery (e.g. whenever capacity allows, only as last resort, etc.), service priority guidelines (e.g. ensure delivery is completed within a threshold time, regardless of cost), and rules for selecting third-party delivery partners (e.g. always choose higher rated partner, regardless of speed or cost of delivery).

An inventory location 330 is typically, but not limited to, a vendor, seller, or source that may have, or may make available, or may manufacture, inventory of a product. An inventory location 330 may be an actual brick-and-mortar location (e.g. a retail store or warehouse), may be operated or controlled by a merchant or, alternatively, a third party to a merchant such as a third party logistics or product provider, or may be a logical source from which the product can be obtained (e.g. another online source) with the capability of the product being shipped to a destination. In some embodiments, an inventory location 330 may be capable of making or manufacturing a product, optionally with product components and labor on site, or alternatively may also have an internal or external source for a product (e.g. outsourcing, drop shipment, and the like) and the inventory assessment for such location may consider the products that can be made or manufactured (such as by considering available components, parts and labor) and not only the products present at the location.

In some embodiments, inventory information may include, without limitation, availability, quantity, variants (e.g. sizes, dimensions, colors, etc.) and condition (e.g. new, refurbished, used, and the like) of product(s) at one or more inventory locations 330. Inventory information may be obtained internal or external to an e-commerce platform 100, and may be acquired by database lookups, API calls, or other computing operations. Inventory information may consider products which may be created, manufactured, or otherwise sourced for prospective or completed transactions, either in real-time or under just-in-time practices or other timeframes, for a particular application or product.

A shipping provider 340 may be a shipping carrier (e.g. UPS, FedEx, shipping capabilities of the platform 100, or the like) that provides shipping and/or delivery services, but it may also be any party (e.g. merchants, on-demand delivery service, etc.) capable of transporting, delivering, or rendering a product to a designated destination. Additionally, or alternatively, a shipping provider 340 may be a local delivery provider (e.g. Uber, Postmates, DoorDash, etc.) providing delivery of consumable products such as food, groceries, alcohol, etc.

In some embodiments, shipping information may include, without limitation, available shipping providers 340 and/or shipping services available (e.g. one-day, two-day, air, ground, and the like). It may also include weight, dimensions, dimensional weight, oversize parameters, handling times, shipping times, shipping costs/rates, restrictions, handling instructions, insurance, proof of delivery/acceptance parameters, customs parameters, Harmonized Commodity Description and Coding System or HTS considerations, tax parameters, origin and destination parameters, and other information related to fulfillment, transport, rendering, or delivery of a product to a destination. Shipping information may also include information on download (such as for a digital or electronic product), freight, pickup, installation, or custom or other arrangements for fulfillment or delivery of a product. Shipping information may be obtained internal or external to an e-commerce platform 100, and may be acquired by database lookups, API calls, or other computing operations.

An API refers to an application programming interface under the conventional definition known in the art, or any software, platform, or communication means that may allow two computing devices or systems to exchange information, such as inventory or shipping information. For example, a shipping provider 340 may have a shipping and delivery API 346 to allow its customers and other parties to retrieve shipping rates, delivery schedules and routes, and other information relating to its service offerings. An e-commerce platform 300 therefore may request information from the shipping provider 340 for a given prospective shipment via the shipping provider's 340 API, and such a request from the e-commerce platform 300 to the shipping provider 340 may be an API call. In such an example, when the shipping provider 340 responds to the e-commerce platform 300 API call that was made, the reply may be an API response. Similarly, inventory locations 330 may have inventory APIs 336 for providing inventory information, such as availability and condition of products.

Figure 4:
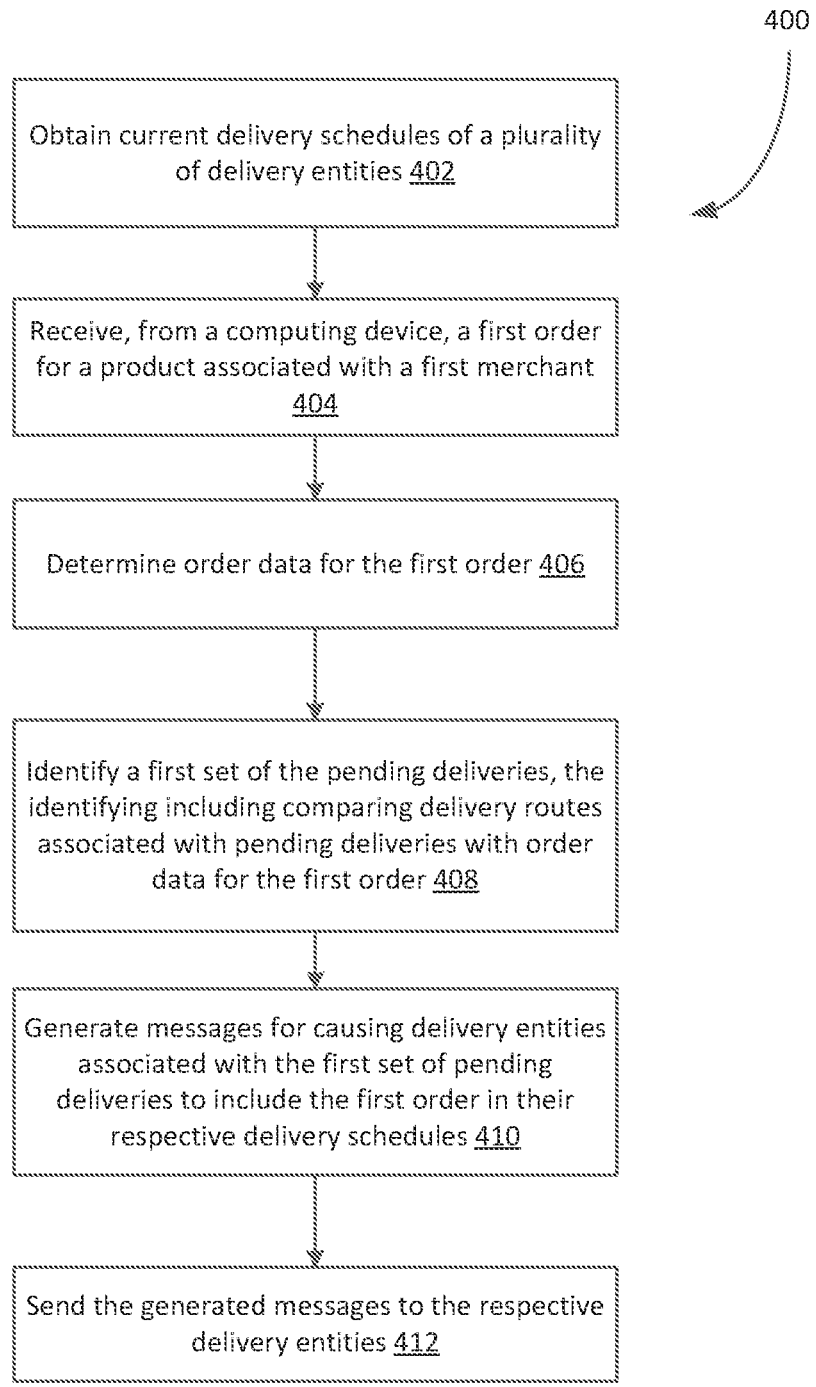
FIG. 4 shows, in flowchart form, an example method for managing delivery of product orders.

Reference is now made to FIG. 4, which shows, in flowchart form, an example method 400 for managing delivery of product orders. The method 400 may be performed by a computing system implementing a delivery management engine (such as the product delivery management system 302 of FIG. 3). The delivery management engine may perform the operations of method 400 when coordinating delivery of products that are offered for sale by merchants (for example, via an e-commerce platform, a point-of-sale at a retail store, etc.). In accordance with method 400, a delivery management engine may be enabled to automatically identify optimal delivery routes for specific product orders. As detailed above, the delivery management engine may be a service that is provided within or external to the e-commerce platform to facilitate, among others, order processing activities on the platform.

In operation 402, the delivery management engine obtains current delivery schedules of a plurality of delivery entities. In at least some embodiments, the delivery management engine may query computing systems associated with a plurality of delivery entities, such as merchants offering delivery services, couriers, and/or on-demand delivery services, to obtain current delivery schedule data for the delivery entities. For example, the delivery management engine may make API calls to shipping APIs associated with a defined set of delivery entities accessible by or known to the delivery management engine. The current delivery schedule data include delivery data for pending deliveries of product orders associated with a plurality of merchants. In particular, the current delivery schedule for a delivery entity identifies merchants and their product orders that are scheduled to be delivered by the delivery entity.

The delivery data may indicate, for each of the pending deliveries of merchant orders, at least one of a pick-up location, a drop-off location, a delivery route, or an expected delivery time. For example, the delivery data may specify an inventory location where an order is to be picked up, a destination address (e.g. the customer's address or desired pick-up location), drop-off locations associated with route segments along the order delivery route, and expected time of arrival of the order at the destination address.

In operation 404, the delivery management engine receives, from a customer computing device, a first order for a product associated with a first merchant. In at least some embodiments, the first order may be input by a customer in a product browsing session on the e-commerce platform using the customer's device. For example, the customer may input a selection of a product from a catalog that is displayed on a webpage associated with a merchant's online store. That is, the selection may be made using a browser application, or the like, on the customer's device. By selecting a product, the customer may navigate to a product webpage associated with the product. The product webpage may display, with or without user input, inventory availability information for the selected product. In particular, the product webpage may display information indicating whether the selected product is available for purchase, remaining stock of the selected product, or time until (or of) next re-stock of the selected product if there is no currently available inventory. The customer may select a user interface element for executing purchase of the product to cause an order to be generated, and the resulting first order may subsequently be transmitted to the delivery management engine.

In operation 406, the delivery management engine ascertains order data for the first order. The order data indicates, at least, an inventory location having available inventory of the product and a delivery destination for the first order. The order data may be transmitted to the delivery management engine via the customer computing device, or it may be obtained by the delivery management engine from the e-commerce platform or a computing system of the merchant associated with the first order. In at least some embodiments, the order data for the first order may be received with the first order. In particular, when the first order is processed by the e-commerce platform, the first order and certain order data (e.g. data fields) associated with the first order may be communicated to the delivery management engine.

In operation 408, the delivery management engine identifies a first set of the pending deliveries for the plurality of merchants. The first set identified in operation 408 represents a set of deliveries that are currently pending for at least one of the merchants and that are suitable for aggregating together with the first order for delivery. That is, the first set includes those deliveries which may be delivered together for at least part of a delivery route for the first order from its origin (e.g. inventory location for the first order) to its destination (e.g. customer address, pick-up location, etc.). The delivery management engine compares delivery routes associated with pending deliveries for the plurality of merchants with the order data for the first order to identify the first set of pending deliveries.

As part of operation 408, the delivery management engine may retrieve delivery route data for all pending deliveries of the plurality of merchants that are handled by the delivery management engine. More generally, order data for all pending orders for the plurality of merchants may be retrieved. The delivery management engine may then search the available delivery route data for a plurality of delivery entities to identify orders which may be aggregated with the first order. The identification of the first set of pending deliveries (i.e. for order aggregation) may be based on various different criteria. By way of example only, the delivery management engine may search for orders having common or similar origin and destination geographical areas as the first order, orders that may have shared segments with the first order along their respective routes from origin to destination, and orders having similar or same required arrival times as the first order. The pending deliveries that satisfy one or more of these criteria in connection with the first order may be included in the first set.

As explained above, the disclosed delivery management engine enables multi-stage delivery across multiple merchants using a network of delivery service options. The delivery management engine may determine one or more route options for delivery of the first order. The route options may indicate, for each route, the travel path and time of travel along the route. Upon obtaining order data for pending deliveries of a plurality of merchants, the delivery management engine may identify the pending deliveries that may be aggregated with the first order using a segment-based approach. That is, for each of the route options for the first order, the delivery management engine may identify possible route segments along the route. The first set of pending deliveries may be selected from those orders that share route segments (e.g. same path traveled, same or similar time of travel) with the first order.

In some embodiments, the first set of pending deliveries may be identified based on evaluating order criteria for the first order. For example, the set of pending deliveries may be filtered based on product-related constraints in connection with the first order. If the first order contains products having special requirements for handling, storage, etc., the first set of pending deliveries may only contain those orders that are compatible with such requirements.

In some embodiments, the first set of pending deliveries may be identified based on evaluating merchant criteria for the first merchant. For example, the first merchant may stipulate certain preferences and/or restrictions relating to delivery partners, aggregated orders, etc. in connection with the first order. The first set of pending deliveries may then only contain those orders that are compatible with such restrictions of the first merchant. For example, the first set of pending deliveries may only contain orders scheduled for delivery by delivery partners that are preferred (or stipulated) by the first merchant.

In operation 410, the delivery management engine generates messages for causing delivery entities associated with the first set of pending deliveries to include the first order in their respective delivery schedules. The generated messages may indicate at least one of a time or a route at which the first order may be slotted into the respective delivery schedules of the delivery entities. The messages may be customized for each delivery entity such that different messages may be generated for different delivery entities. For example, a customized message for a delivery entity may only specify delivery information (e.g. pick-up and drop-off locations, times, etc.) corresponding to the route segments along which the delivery entity is responsible for transporting the first order.

In operation 412, the delivery management engine sends the generated messages to the respective delivery entities. In particular, the messages may be transmitted to computing systems that are associated with the delivery entities.

In at least some embodiments, the delivery management engine may be configured to monitor real-time locations of one or more delivery vehicles that are associated with the plurality of delivery entities. The delivery management engine may directly obtain real-time location data for the delivery vehicles, or it may receive the location data from a third-party source (e.g. computing systems associated with the delivery entities). In operation 408, the first set of the pending deliveries may be identified based on the real-time locations of the one or more delivery vehicles. That is, when identifying pending deliveries that may be aggregated with the first order, the real-time locations of delivery vehicles deployed by delivery entities may be factored. In particular, the first set of pending deliveries may be selected based on current availability and locations of delivery vehicles associated with the delivery entities. For example, if the delivery schedule data for the delivery entities is inconsistent with real-time locations of deployed delivery vehicles (e.g. due to traffic delays, etc.), this information may be used to inform the selection, by the delivery management engine, of pending deliveries which may be aggregated with the first order.

Figure 5:
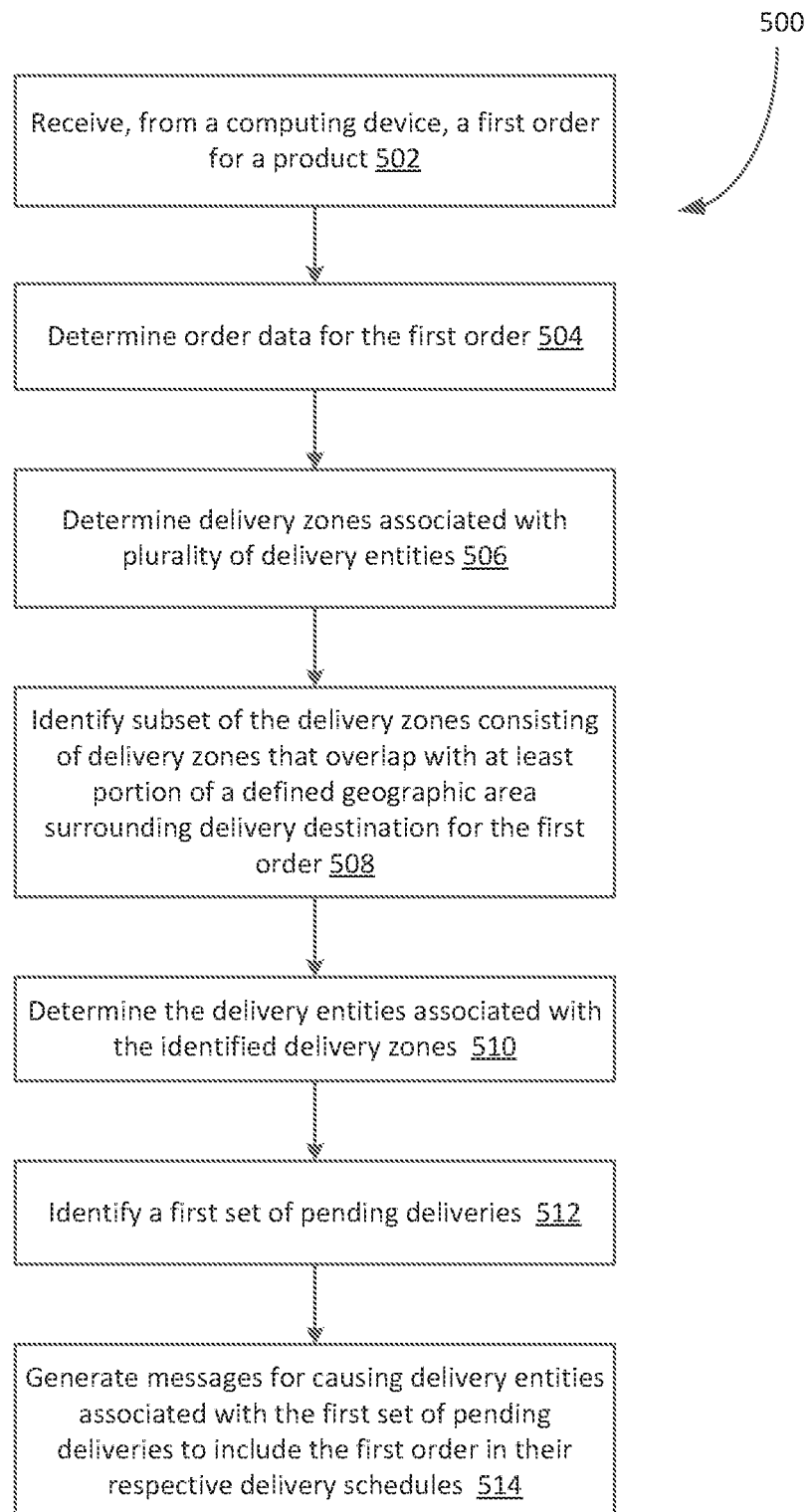
FIG. 5 shows, in flowchart form, another example method for managing delivery of product orders.

Reference is now made to FIG. 5, which shows, in flowchart form, another example method 500 for managing delivery of product orders. The method 500 may be performed by a computing system implementing a delivery management engine (such as the product delivery management system 302 of FIG. 3). The delivery management engine may perform the operations of method 500 when coordinating delivery of products that are offered for sale by merchants on an e-commerce platform. It will be understood that the delivery management engine may be configured to perform the operations of method 500 in addition to and/or in combination with one or more of the operations of method 400 of FIG. 4 when managing delivery of products that are offered for sale on an e-commerce platform.

In operation 502, the delivery management engine receives, from a customer computing device, a first order for a product. In operation 504, the delivery management engine determines order data for the first order. Operations 502 and 504 correspond to, and may be performed in a similar manner as, operations 404 and 406 of method 400.

In operation 506, the delivery management engine determines delivery zones associated with a plurality of delivery entities. A delivery entity may have coverage over specific geographical regions at specific times. In particular, a delivery entity may have resources (e.g. delivery vehicles) deployed in specific geographical regions that make the delivery entity capable of delivering orders in those regions at specific times. By ascertaining delivery zones (of coverage) associated with one or more delivery entities, the delivery management engine may be able to identify a reduced set of pending deliveries from which orders for aggregating with the first order can be selected.

In at least some embodiments, the delivery management engine may obtain, for each of at least one of the delivery entities, a current delivery schedule. The delivery zones associated with the plurality of delivery entities may be determined based on the current delivery schedules for the plurality of delivery entities. Specifically, the current delivery schedules may indicate the zones that may be covered by the delivery entities, given availability of the resources deployed by those delivery entities, at different points in time.

In some embodiments, the delivery management engine may determine, for each of at least one of the delivery entities, a defined geographic region that is covered by the delivery entity. That is, a delivery entity may have fixed boundaries defining the coverage area for delivering orders. The delivery zones associated with the plurality of delivery entities may be determined based on the defined geographic regions. The geographic region information for the delivery entities may be obtained, for example, from the delivery entities and stored by the delivery management delivery.

In operation 508, the delivery management engine identifies a subset of the delivery zones that includes one or more delivery zones overlapping with at least a portion of a defined geographic area surrounding the delivery destination for the first order. In particular, the delivery management engine determines the delivery zones having coverage over at least part of the geographic area including the destination for the first order. Additionally, or alternatively, the delivery management engine may identify delivery zones overlapping with at least a portion of a defined geographic area surrounding the origin (i.e. merchant inventory location). In some embodiments, the delivery management engine may identify delivery zones that overlap with any part of routes that extend between the origin and destination for the first order. More specifically, the delivery management engine may identify delivery zones having coverage over any segment of one or more possible delivery routes for the first order.

In some embodiments, the identification of delivery zones in operation 508 may be based on merchant location data. More specifically, the delivery zones may be identified based on defined distance limits (e.g. a defined radius) associated with the merchant location(s) (e.g. location of the merchant's warehouse, retail store, etc.). The delivery management engine may determine the merchant location and apply any defined distance limits for the merchant to identify qualifying delivery zones with respect to the merchant location, and identify those of the delivery zones that overlap with the geographic area surrounding the delivery destination for the first order.

In operation 510, the delivery management engine determines the delivery entities corresponding to the one or more delivery zones identified in operation 508. The delivery management engine subsequently identifies a first set of the pending deliveries, in operation 512, for order aggregation with the first order. In particular, the first set of the pending deliveries is determined from the reduced set of deliveries corresponding to the delivery entities identified in operation 510. That is, order aggregation for the first order may only occur with orders that are scheduled for delivery by those delivery entities whose coverage areas (e.g. delivery zones) coincide with at least one of an origin of the first order or a delivery destination for the first order.

In operation 514, the delivery management engine generates messages for causing delivery entities associated with the first set of pending deliveries to include the first order in their respective delivery schedules. The messages may indicate, for example, route (or route segments) and times of travel for which the respective delivery entities are responsible for transporting the first order.

Figure 6:
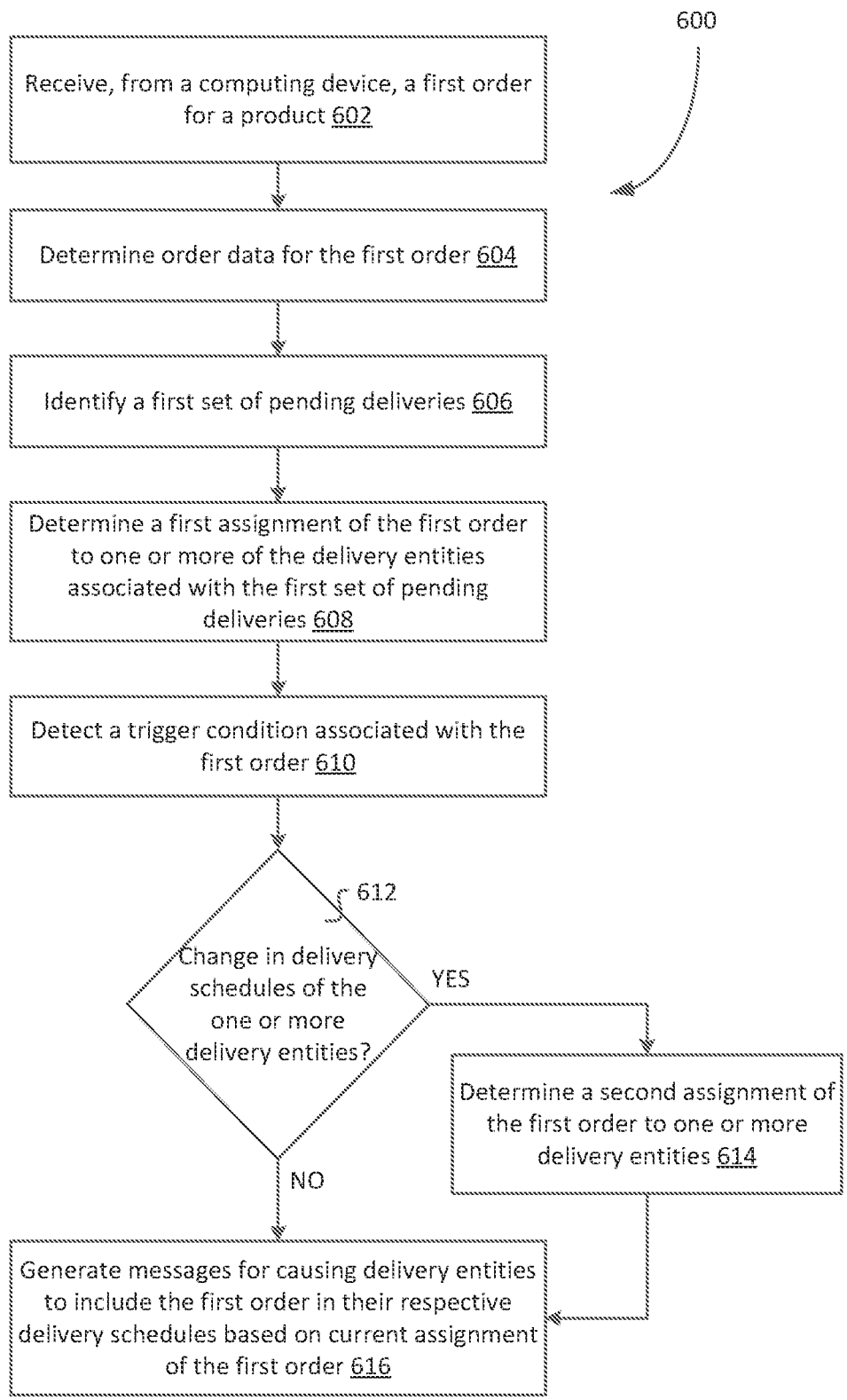
FIG. 6 shows, in flowchart form, an example method for processing an order for a product.

Reference is now made to FIG. 6, which shows, in flowchart form, an example method 600 for managing delivery of product orders. The method 600 may be performed by a computing system implementing a delivery management engine (such as the product delivery management system 302 of FIG. 3). The delivery management engine may perform the operations of method 600 when coordinating delivery of products that are offered for sale by merchants on an e-commerce platform. It will be understood that the delivery management engine may be configured to perform the operations of method 600 in addition to and/or in combination with one or more of the operations of method 400 of FIG. 4 and method 500 of FIG. 5 when managing delivery of products that are offered for sale on an e-commerce platform.

In operation 602, the delivery management engine receives, from a customer computing device, a first order for a product. In operation 604, the delivery management engine determines order data for the first order. The delivery management engine identifies a first set of pending deliveries for order aggregation with the first order, in operation 606. Operations 602, 604 and 606 correspond to, and may be performed in a similar manner as, operations 404, 406 and 408 of method 400, respectively.

In operation 608, the delivery management engine determines a first assignment of the first order to one or more of the delivery entities associated with the first set of pending deliveries. The first assignment represents a mapping of delivery entities to routes (or route segments) and times of travel such that a delivery entity is responsible for transporting the first order along the corresponding route/route segment at the corresponding time, in accordance with the first assignment.

In operation 610, the delivery management engine detects a trigger condition associated with the first order. A trigger condition represents a possible reason for re-assigning delivery of the first order among one or more delivery entities. That is, if the delivery management engine detects one or more defined trigger conditions, the delivery management engine may determine that a different assignment of the first order to one or more delivery entities is suitable. A re-assignment may result in a change to delivery schedule associated with at least one delivery entity. For example, an assigned delivery job for transporting the first order may be deleted from the delivery schedules of one or more delivery entities as a result of a re-assignment.

A trigger condition may, for example, be a cancellation of a delivery route for a delivery entity. Another trigger condition may be a change in priority or order for delivering the first order by a delivery entity. For example, if a merchant having delivery capacity to deliver the first order along at least a route segment abandons the delivery of the first order (e.g. in favor of delivering another order), the delivery management engine may detect that a trigger condition has occurred. More generally, a trigger condition may be an event which may cause the delivery schedules of one or more of the delivery entities to be changed. The delivery management engine may detect a trigger condition based on data that is obtained from, for example, a delivery entity computing system, a delivery resource (e.g. vehicle) of a delivery entity, or a customer computing device.

In operation 612, the delivery management engine determines whether there is a change in delivery schedules of the one or more delivery entities. That is, the delivery management engine determines if the trigger condition resulted in a change in the delivery schedule of at least one of the delivery entities previously assigned for delivering the first order.

If a change in delivery schedules is detected, the delivery management engine determines a second assignment of the first order to one or more delivery entities, in operation 614. The second assignment represents a change to the delivery schedule of at least one delivery entity. For example, the second assignment may include a different set of delivery entities that are assigned to deliver the first order. As another example, the second assignment may have the same set of delivery entities as the first assignment, with different order or time slot for delivery of the first order by at least one of the delivery entities. This second assignment may then be deemed to be the current assignment of the first order to delivery entities, such that the delivery of the first order may proceed by way of the second assignment, unless or until a trigger condition is possibly detected.

In operation 616, the delivery management engine generates messages for causing delivery entities to include the first order in their respective delivery schedules based on the current assignment of the first order. In particular, the messages are to cause the delivery entities to update their respective delivery schedules with respect to the first order in response to the detected trigger condition.

While the above description of method 600 refers to detection of a trigger condition as a pre-condition for determining a re-assignment of orders to delivery entities, it will be understood that the delivery management engine may re-evaluate assignment of orders even in the absence of such triggers. For example, the delivery management engine may re-evaluate assignments periodically based on a defined schedule or upon receipt of a request (e.g. by a merchant system) to re-evaluate the assignments.

IMPLEMENTATIONS

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In some embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g. Long-Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer-implemented method, comprising:
obtaining, by a computing system, current delivery schedules of a plurality of delivery entities via shipping application programming interface (API) queries transmitted over a network, the current delivery schedules including delivery data for pending deliveries of product orders associated with a plurality of merchants;
receiving, by the computing system over a network, via a graphical user interface provided on a customer computing device, a first order for a product associated with a first merchant on an online e-commerce system;
determining, by the computing system, order data for the first order, the order data indicating, at least, an inventory location having available inventory of the product and a delivery destination for the first order;
identifying, by the computing system, a first set of the pending deliveries for aggregating with the first order, the identifying including:
determining, for each of the plurality of delivery entities, a delivery zone based on fixed boundaries defining at least one coverage area of the delivery entity;
identifying a subset of the delivery zones that includes one or more delivery zones overlapping with at least a portion of a defined geographic area surrounding the delivery destination;
obtaining, by the computing system, real-time location data indicating current locations of one or more delivery vehicles associated with delivery entities associated with the identified subset of the delivery zones;
determining, by the computing system, one or more possible routes associated with delivery of the first order, each of the one or more possible routes defining route segments along the route; and
identifying, by the computing system, the first set based on the real-time location data and route segments data associated with the one or more possible routes, the identifying including determining orders that share route segments with the first order;
generating, by the computing system, messages for causing delivery entities associated with the first set of the pending deliveries to include the first order in their respective delivery schedules; and
transmitting, by the computing system over the network, to each of computing systems associated with the plurality of delivery entities, a respective one of the generated messages.

2. The method of claim 1, wherein at least one of the delivery entities is a second merchant offering delivery services for product orders.

3. The method of claim 1, wherein the delivery data indicate, for each of the pending deliveries, at least one of a pick-up location, a drop-off location, a delivery route, or an expected delivery time.

4. The method of claim 1,
wherein identifying the first set of the pending deliveries comprises determining the delivery entities associated with the one or more first delivery zones.

5. The method of claim 4, further comprising obtaining, by the computing system, for each of at least one of the delivery entities, a current delivery schedule, wherein the delivery zones associated with the plurality of delivery entities are determined based on the current delivery schedules for the plurality of delivery entities.

6. The method of claim 1, wherein the generated messages indicate at least one of a time or a route at which the first order may be slotted into the respective delivery schedules of the delivery entities.

7. The method of claim 1, wherein the first set of the pending deliveries is identified based on evaluating at least one of: order criteria for the first order; or merchant criteria for the first merchant.

8. The method of claim 1, further comprising:
detecting, by the computing system, a trigger condition associated with the first order;
in response to detecting the trigger condition, generating, by the computing system, second messages for causing delivery entities associated with the first set of the pending deliveries to update their respective delivery schedules with respect to the first order.

9. A product delivery management system, comprising:
a database storing data for a plurality of product items;
a processor; and
a memory storing computer-executable instructions that, when executed by the processor, are to cause the processor to:
obtain current delivery schedules of a plurality of delivery entities via shipping application programming interface (API) queries transmitted over a network, the current delivery schedules including delivery data for pending deliveries of product orders associated with a plurality of merchants;
receive, over a network via a graphical user interface provided on a customer computing device, a first order for a product associated with a first merchant on an online e-commerce system;
determine order data for the first order, the order data indicating, at least, an inventory location having available inventory of the product and a delivery destination for the first order;
identify a first set of the pending deliveries for aggregating with the first order, the identifying including:
determining, for each of the plurality of delivery entities, a delivery zone based on fixed boundaries defining at least one coverage area of the delivery entity;
identifying a subset of the delivery zones that includes one or more delivery zones overlapping with at least a portion of a defined geographic area surrounding the delivery destination;
obtaining real-time location data indicating current locations of one or more delivery vehicles associated with the plurality of delivery entities associated with the identified subset of the delivery zones;
determining one or more possible routes associated with delivery of the first order, each of the one or more possible routes defining route segments along the route; and
identifying the first set based on the real-time location data and route segments data associated with the one or more possible routes, the identifying including determining orders that share route segments with the first order;
generate messages for causing delivery entities associated with the first set of the pending deliveries to include the first order in their respective delivery schedules; and
transmit, over the network to each of computing systems associated with the plurality of delivery entities, a respective one of the generated messages.

10. The system of claim 9, wherein at least one of the delivery entities is a second merchant offering delivery services for product orders.

11. The system of claim 9, wherein the delivery data indicate, for each of the pending deliveries, at least one of a pick-up location, a drop-off location, a delivery route, or an expected delivery time.

12. The system of claim 9,
wherein identifying the first set of the pending deliveries comprises determining the delivery entities associated with the one or more first delivery zones.

13. The system of claim 12, wherein the instructions, when executed, cause the processor to:
obtain, for each of at least one of the delivery entities, a current delivery schedule, wherein the delivery zones associated with the plurality of delivery entities are determined based on the current delivery schedules for the plurality of delivery entities.

14. The system of claim 9, wherein the generated messages indicate at least one of a time or a route at which the first order may be slotted into the respective delivery schedules of the delivery entities.

15. The system of claim 9, wherein the first set of the pending deliveries is identified based on evaluating at least one of: order criteria for the first order; or merchant criteria for the first merchant.

16. The system of claim 9, wherein the instructions, when executed, cause the processor to:
detect a trigger condition associated with the first order;
in response to detecting the trigger condition, generate second messages for causing delivery entities associated with the first set of the pending deliveries to update their respective delivery schedules with respect to the first order.

17. A non-transitory, computer-readable medium storing computer-executable instructions that, when executed by a processor, configure the processor to:
obtain current delivery schedules of a plurality of delivery entities via shipping application programming interface (API) queries transmitted over a network, the current delivery schedules including delivery data for pending deliveries of product orders associated with a plurality of merchants;
receive, over a network via a graphical user interface provided on a customer computing device, a first order for a product associated with a first merchant on an online e-commerce system;
determine order data for the first order, the order data indicating, at least, an inventory location having available inventory of the product and a delivery destination for the first order;
identify a first set of the pending deliveries for aggregating with the first order, the identifying including:
determining, for each of the plurality of delivery entities, a delivery zone based on fixed boundaries defining at least one coverage area of the delivery entity;
identifying a subset of the delivery zones that includes one or more delivery zones overlapping with at least a portion of a defined geographic area surrounding the delivery destination;
obtaining real-time location data indicating current locations of one or more delivery vehicles associated with delivery entities associated with the identified subset of the delivery zones;

determining one or more possible routes associated with delivery of the first order, each of the one or more possible routes defining route segments along the route; and identifying the first set based on the real-time location data and route segments data associated with the one or more possible routes, the identifying including determining orders that share route segments with the first order;

generate messages for causing delivery entities associated with the first set of the pending deliveries to include the first order in their respective delivery schedules; and transmit, over the network to each of computing systems associated with the plurality of delivery entities, a respective one of the generated messages.

18. The computer-readable medium of claim 17, wherein at least one of the delivery entities is a second merchant offering delivery services for product orders.

* * * * *